(No Model.) 4 Sheets—Sheet 1.
W. W. ALEXANDER.
ELECTROMECHANICAL LOCK.

No. 548,282. Patented Oct. 22, 1895.

WITNESSES
L. C. Hills
E. R. Gill

INVENTOR
William W. Alexander,
by E. E. Masson
Attorney (No Model.) 4 Sheets—Sheet 2.
W. W. ALEXANDER.
ELECTROMECHANICAL LOCK.
No. 548,282. Patented Oct. 22, 1895.
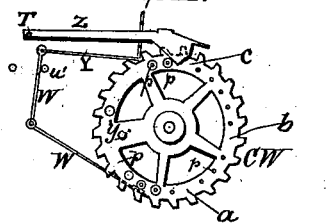
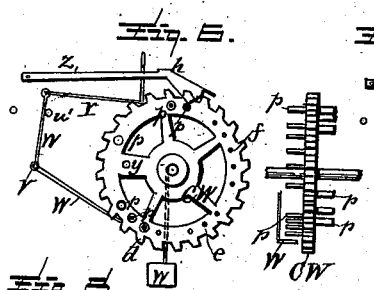
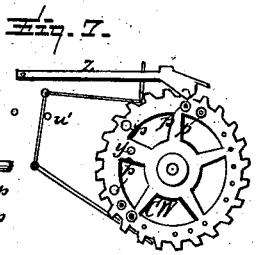
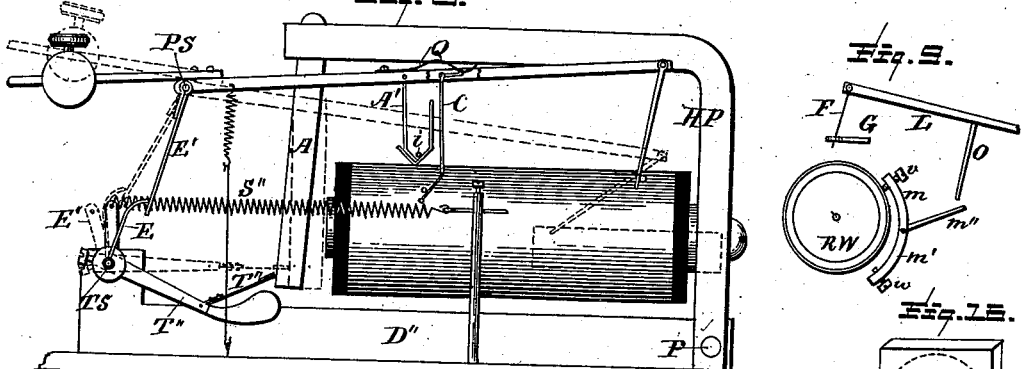
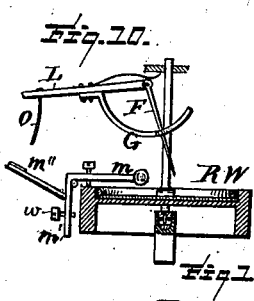
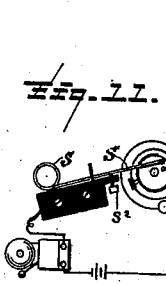
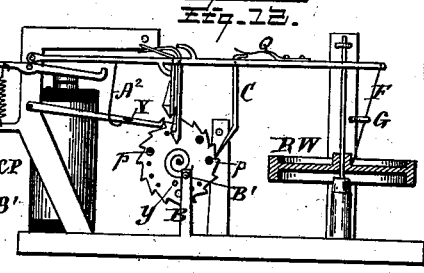
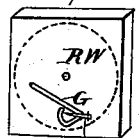
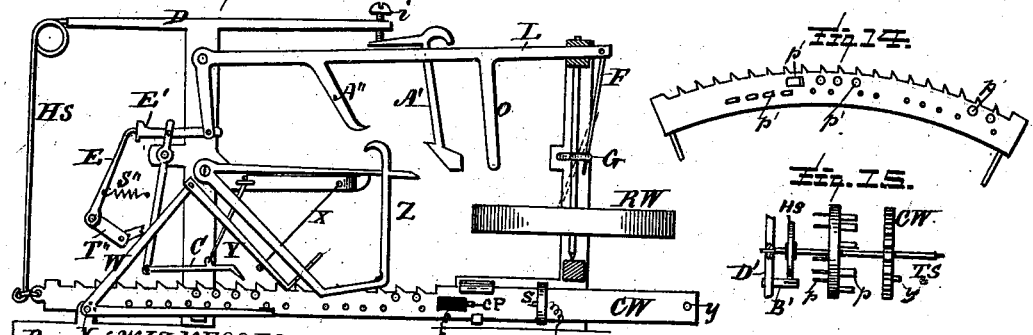
WITNESSES
L. C. Hills
E. R. Gill Jr.
INVENTOR
William W. Alexander
by E. E. Masson
Attorney (No Model.) 4 Sheets—Sheet 3.
W. W. ALEXANDER.
ELECTROMECHANICAL LOCK.

No. 548,282. Patented Oct. 22, 1895.

WITNESSES
L. C. Hills
E. R. Gill Jr.

INVENTOR
William W. Alexander
by E. E. Masson
Attorney (No Model.)     W. W. ALEXANDER.     4 Sheets—Sheet 4.
ELECTROMECHANICAL LOCK.
No. 548,282.           Patented Oct. 22, 1895.
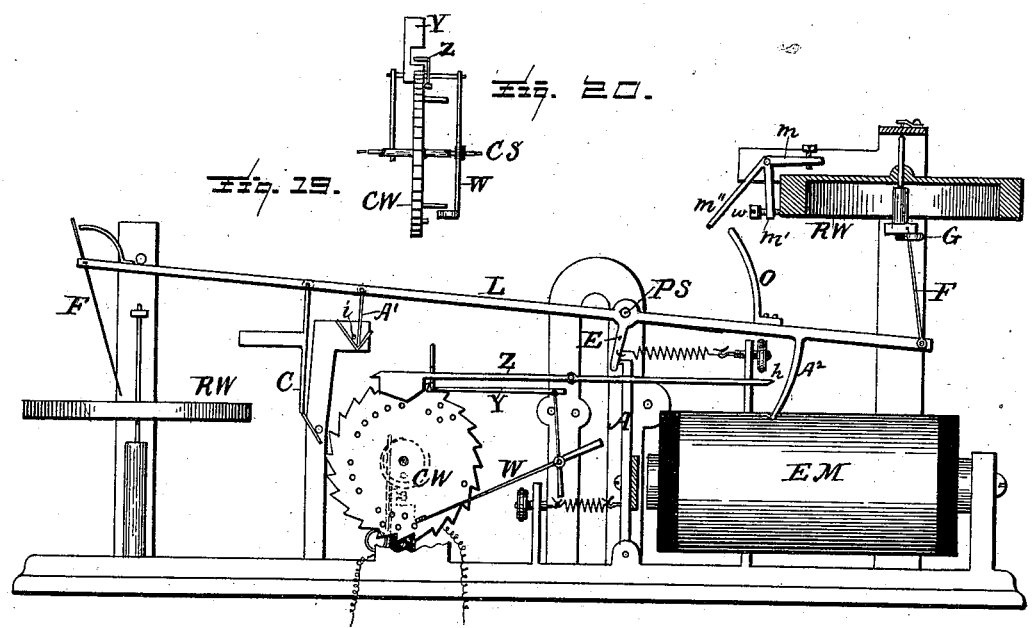
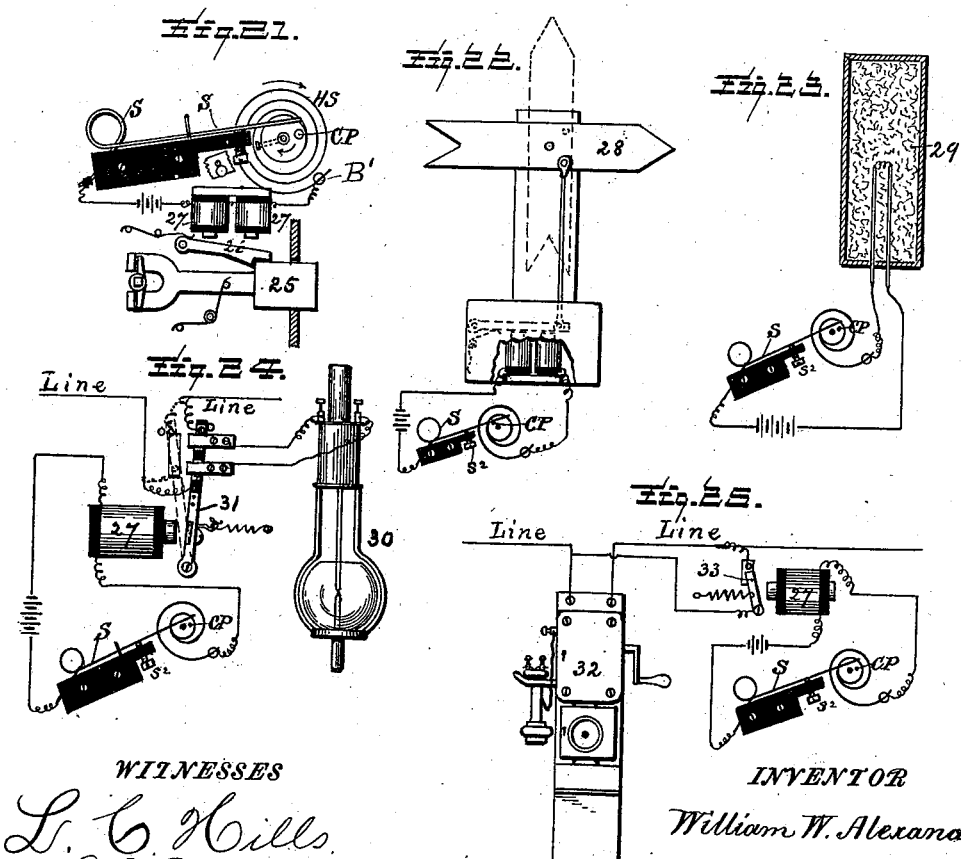
WITNESSES
L. C. Hills.
E. R. Gill Jr.
INVENTOR
William W. Alexander
by E. E. Masson,
Attorney

UNITED STATES PATENT OFFICE.

WILLIAM W. ALEXANDER, OF KANSAS CITY, MISSOURI, ASSIGNOR TO THE GILL-ALEXANDER ELECTRIC MANUFACTURING COMPANY, OF SAME PLACE.

ELECTROMECHANICAL LOCK.

SPECIFICATION forming part of Letters Patent No. 548,282, dated October 22, 1895.

Application filed November 15, 1889. Serial No. 330,409. (No model.)

*To all whom it may concern:*

Be it known that I, WILLIAM W. ALEXANDER, a citizen of the United States, residing at Kansas City, in the county of Jackson, State of Missouri, have invented certain new and useful Improvements in Electromechanical Combination-Locks, of which the following is a specification, reference being had therein to the accompanying drawings.

My invention relates to devices for electromechanically operating electric circuits; and the object of my improvements is to produce a simple and reliable electromechanical apparatus adapted to operate various mechanisms by predetermined combinations of short and long impulses of electricity acting upon an electromagnet and through its armature upon the levers, pawls, and combination-wheel, as hereinafter described.

Figure 1:
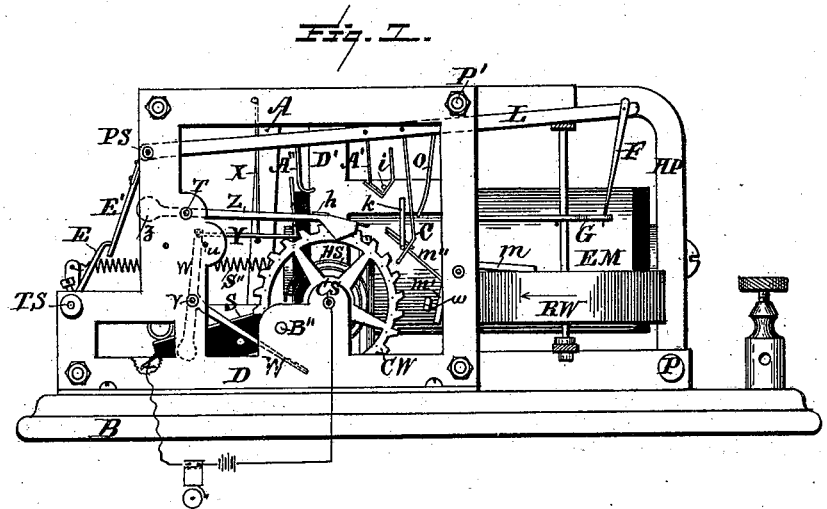
Figure 2:
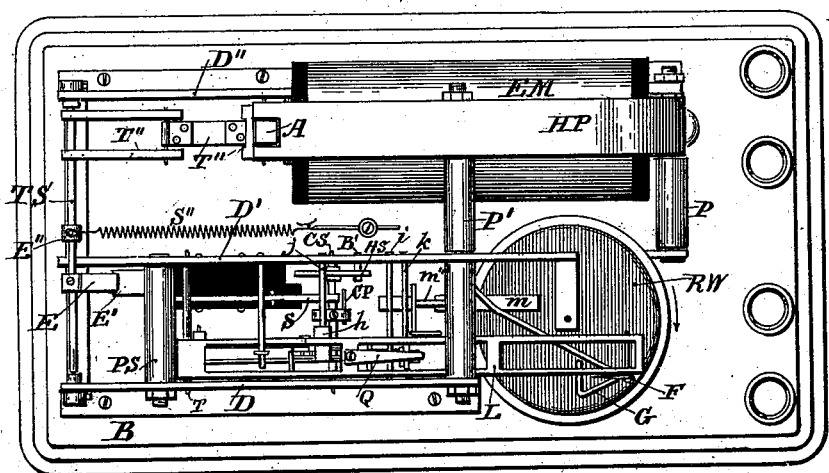
Figure 17:
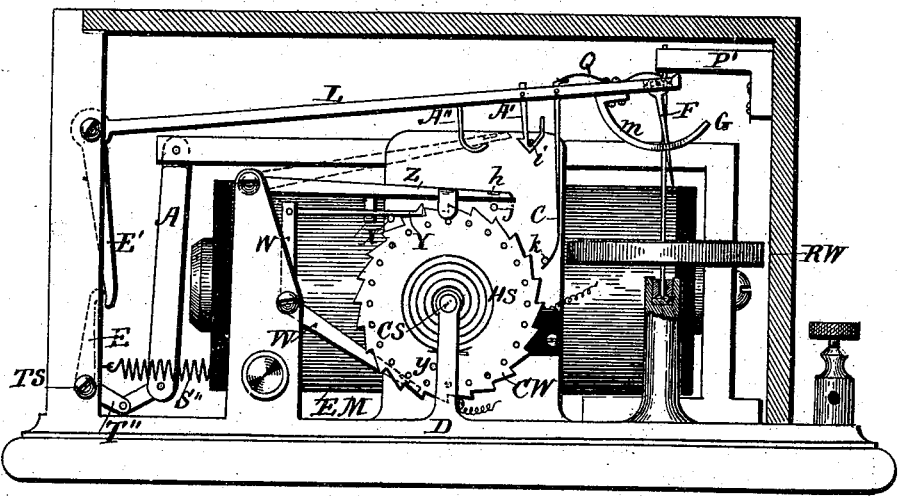
Figure 18:
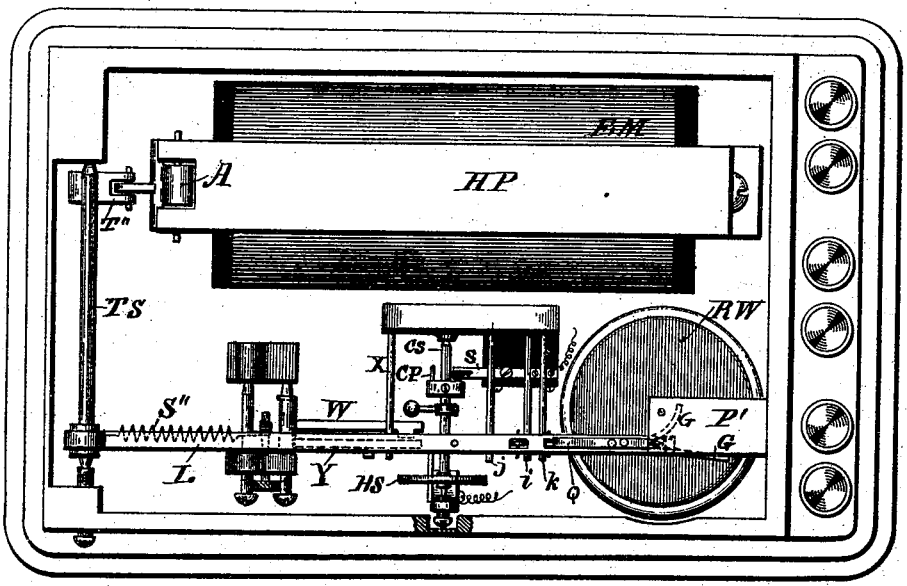

In the accompanying drawings, Figure 1 is a side view of an apparatus constructed in accordance with my invention. Fig. 2 is a plan view of the apparatus. Figs. 3, 4, 5, 6, and 7 are side views of the combination-wheel with its pawls, pins, and levers, showing the separate and combined movements of the parts by which the wheel is either retained after each forward movement or allowed to return to its normal position. Fig. 5$^a$ represents a combination of impulses which will correctly operate the device according to the present arrangement of the pins therein. Fig. 8 represents in side view the electromagnet with its armature and toggle-joint levers connecting it with the toggle-shaft TS, showing in dotted lines the position assumed by the parts when the armature is acted upon by the electromagnet. Figs. 9 and 10 represent in side view and vertical section modifications of the inertia or retardation wheel and its operating pawls, levers, and brakes. Fig. 11 represents a side view of the combination-wheel shaft, hair-spring, contact-spring, and contact-pin, and the circuit connections. Figs. 12 and 13 represent in side view modifications of the electromechanical apparatus. Fig. 14 is a side view of a segmental rack provided with pins or lugs projecting therefrom and adapted for use with the apparatus. Fig. 15 is a top view of the shaft carrying a disk provided with teeth, a disk provided with combination-pins, and a coiled spring to operate said shaft. Fig. 16 is a perspective view of a retardation wheel or disk of polygonal form as a modification. Fig. 17 is a side view of a slightly-modified form of electromechanical apparatus. Fig. 18 is a plan of the same. Fig. 19 is a side view of another slightly-modified form of electromechanical apparatus in which two retardation-wheels are used. Fig. 20 is an edge view of the combination-wheel and three of its pawls as shown in Fig. 19. Fig. 21 is a diagram representing an application of my invention to unlocking an ordinary lock-bolt by closing the electric circuit. Fig. 22 is a diagram representing an application of my invention to operating a visual signal. Fig. 23 represents an application of my invention to the firing of explosives. Fig. 24 represents an application of my invention to cutting in and cutting out of circuit an electric light. Fig. 25 represents an application of my invention to cutting in and cutting out of circuit a telephone instrument.

In said drawings, B represents a base upon which is placed the frame for supporting several parts of the device.

P and P' represent horizontal posts upon which is mounted the heel-plate HP, carrying an electromagnet EM, and upon the free end of the heel-plate the armature A is pivoted. Nearly centrally of the plates D and D' of the frame there is pivoted a horizontal shaft CS, carrying a toothed wheel CW, a hair-spring HS, and a contact-point CP, projecting laterally from a disk upon said shaft. The desired combination is formed by small pins *p*, fastened to the wheel CW near its periphery and extending beyond one side or the other, or both sides, as shown in Figs. 5, 6, and 7, wherein the pins are shown of larger diameter on one side of the wheel than upon the other side simply to distinguish them.

To rotate the combination-wheel CW in one direction, a hair-spring HS is mounted upon the shaft of said wheel and has its inner end secured to said shaft, while the other end is secured to the horizontal post B', attached to the plate D'. To rotate the combination-wheel CW in the opposite direction, a lever L, having one end attached to shaft PS, pivoted in the frame, is allowed to descend, (by the action of the electromagnet, as seen in Fig. 8,) said lever L carrying pivoted thereto the pushing-pawl C, that has adjacent to the pivot a horizontal arm, which, by virtue of the spring Q pressing upon said arm, will engage the teeth of the combination-wheel when said lever begins to descend. The spring Q has one end attached to the lever L, and the other end presses upon the arm of the pawl. If the lever L were allowed to descend its entire course, the wheel CW would be moved forward about the distance of two teeth, which is the action desired for a long pulsation.

To prevent the lever L from descending its entire course immediately, a retarding-pawl F is loosely pivoted upon the lever L (near its free end) to strike obliquely upon an inertia or retardation wheel RW, preferably horizontal, and cause said lever to stop in its descent (after its pushing-pawl C has carried the wheel CW forward one tooth or space) for a moment until the weight of the lever L and its parts overcomes the inertia of the wheel RW, causing it to rotate in the direction of the arrow, as shown in Figs. 1 and 2, which action will allow the lever L to descend its entire course; but if it is desired that the wheel CW be propelled the distance of one tooth or space only the lever L will be allowed to descend until the retarding-pawl F strikes upon the wheel RW, and thus rotate the combination-wheel CW one tooth, (which is the action desired for a short pulsation,) and before the inertia of the wheel RW is overcome the lever L returns to its upward or normal position against the stop-post P'.

In operating the device if the toothed wheel CW and the lever L are in their normal position, as shown in Fig. 1, and said lever is allowed to descend it will traverse about half of the distance, and then the retarding-pawl F will strike upon the retardation-wheel RW, and then said wheel RW, acting under the weight or pressure of lever L, will commence to rotate and allow said lever to descend the entire length of its course, and as the lever L moves downward it carries with it the retarding-pawl F, the pushing-pawl C, hooks A' and A'', and a rigidly-attached arm O, and as the free end of the pushing-pawl C immediately from the start engages the space 1 of the wheel CW said wheel will have been propelled against the tension of the hairspring HS the distance of two teeth, and in that case the detent Y will have entered the notch 17, and now if the lever L is allowed to ascend the wheel CW will immediately turn back to normal position. The detent Y now prevents the wheel CW from returning to normal position by the movement shown in dotted lines in Fig. 3, but not by being elevated free from the wheel CW by the pallet Z, as shown by dotted lines in Fig. 4 and as hereinafter described. The detent Y is supported at a point near its free end from a rod X, pending from the frame D, and has its outer end pivoted to the upper arm of the bell-crank lever W, which is pivoted at V to the frame D. The lower arm of said lever has a flat finger projecting laterally toward the wheel CW and is adapted to be arrested in its upward motion by the presence of one of the pins $p$. Starting from this normal position, if a short pulsation of electricity is passed through the electromagnet EM it will attract the armature A and draw the toggle-arms T'' immediately into a horizontal position, and the outer arms, being connected rigidly to the shaft TS, will cause it to turn and with it the arms E and E'' (which are also rigidly attached to the shafts) to the position shown in dotted lines in Fig. 8, and the arm E'' will be turned back against the tension of the spring S''. When the parts are in this position, the arm E having been thrown back from the arm E' (which is rigidly attached to the shaft PS, as is lever L) the lever L will be allowed to descend, and now if the circuit be broken through EM the arm E'', acting under the tension of spring S'', will turn the shaft PS and its parts, together with the lever L, (by the arm E, acting upon the arm E',) back to normal position, producing the actions herein described. Starting from this normal position, if a short pulsation of electricity is passed through EM the lever L (acted upon by gravity) will descend only about one-half of its course and immediately return to its former position against the stop-post $P^4$; but the wheel CW will not return to normal position on account of the obstruction presented by one of the combination-pins extending beyond the farther side of the combination-wheel and in such position as to prevent the lower arm W from moving upward, and consequently holding the detent Y rigid, the free end of which has become engaged in the space 18, and the same operation will be repeated for the next two short pulsations, and the detent Y will rest in notch 16. Now if a pulsation of long duration be passed through EM the lever L is thus allowed to descend its whole course, carrying the wheel CW forward a distance of two teeth, and the detent Y will engage the space or notch 14 and prevent the wheel CW from returning to normal position when the lever L ascends to its normal position, as before described. The next two pulsations in the combination being two pulsations of short duration the wheel CW will be propelled the distance of one tooth each successive time, the lever L being allowed to descend only one-half of its course each time, which action will leave the detent Y in engagement with the space or notch 12. Now if a long pulsation be made through EM the lever L will thus be allowed to descend its whole course, carrying the wheel CW forward the distance of two teeth or spaces, and the detent Y, having engaged the notch 10, will prevent the wheel CW from returning to its normal position when the said lever ascends to the top of its course. The next four pulsations in the combination are short ones, and the wheel CW will be propelled the distance of four spaces, one at a time, and the detent Y will retain the wheel CW from returning to normal position after each pulsation in the combination, (by virtue of the combination-pins acting upon the finger of the end of the lower arm W and preventing it from moving upward, as described,) and is now engaged with notch 6. Now if a long pulsation of electricity be passed through EM the lever L will descend the entire length of its downward movement before returning against the post P' and carry the wheel CW two teeth, leaving the detent Y engaged with the notch 4.

During the forward movement of the combination-wheel CW it has carried the shaft CS and with it the contact-point CP (which is adjustably attached thereto) around until said pin is in close proximity to the contact-spring S, adjustably secured to, but insulated from, the frame-plate D', and if the lever L is then allowed to descend either one-half or the whole of its course the pin CP in either case will be brought in contact with the contact-spring S, thereby closing an electric circuit (of which the pin CP and contact-spring S are the terminals thereof, as shown in Fig. 11) and immediately returning to normal position. Consequently the circuit will be broken.

If the wheel CW is propelled the distance of one tooth or notch when the combination of pins is arranged for a long pulsation or two teeth, as shown at $a\ b\ c$ in Fig. 5$^a$, the wheel CW will not be prevented from returning to normal position on account of the absence of a pin in the path of the finger of lever W.

Figures 3, 4:
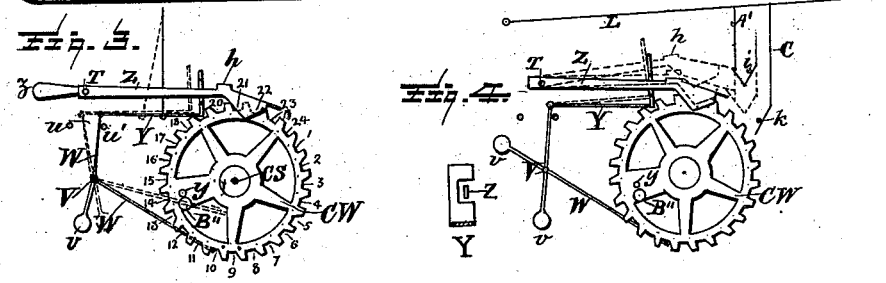

If the wheel CW is propelled the distance of two teeth or notches when the combination-pins are arranged for a short pulsation or pulsations, as represented at $d\ e\ f$ in the combination, Fig. 5$^a$, and as shown upon the wheel CW in Fig. 6, the said wheel will not be prevented from returning to normal position, because the combination-pins $p$, that extend beyond the front side of wheel CW, strike upon an inclined surface projecting from the under side of the pallet Z and raising it into such a position that the hook A' can catch under a lip projecting from the free end of said pallet Z, said pallet being pivoted at T to the frame, and, as shown in dotted lines in Fig. 4, carries it upward, (when the lever L returns to the top of its course,) and by virtue of the laterally-slotted upward extension on the inner end of the detent Y, which hooks over the pallet Z, the detent Y will also be carried upward with the pallet Z, thereby allowing the wheel CW to freely return to its normal position, and immediately before the lever L reaches normal position a horizontal pin $i$, secured to the frame D', acts upon an inclined part of the hook A', causing it to move away from the pallet Z and allow the said pallet to drop or fall toward its normal position; but the wheel CW (if it had been propelled some distance) would not yet have reached its normal position and it would not be desirable to let the detent Y drop upon the wheel before the said wheel had reached its normal position. Consequently a hook A'' is attached to the lever L in such a manner as to be under the laterally-extended lip or arm $h$ of the pallet Z, which is shown in Figs. 1 and 2 resting upon the stud $j$, extending from the frame D', the hook A'' thereby catching the said pallet and preventing it, with the detent Y, from falling to its normal position until the lever L starts to descend, which action will cause the hook A'' to be thrown back from the arm $h$ and separate them. This action is produced by the radius of the ends of hooks A'' and of the arm $h$ of the pallet Z describing arcs of different circles. A pin $k$, secured to the frame D, as will be seen in Fig. 1, being rigid, causes the pushing-pawl C (by acting upon the purposely bent or inclined portion of its free end) to become disengaged from the notches of the wheel CW immediately before it reaches the top of its course.

To cause the beveled surface on the under side of the pallet Z to bear very lightly upon the pin $p$, projecting from the front or outer surface of the wheel CW, the opposite end of said pallet is partially counterbalanced by a weight $z$. The lever W is also provided with one or two light weights $v$ to partially counterbalance it on the end of the arm or arms secured to the pivot-shaft V of said lever, so that the free end of the lower arm of said lever W will be nearly but not quite counterbalanced with its lateral finger, Fig. 7, adapted to rest against the under side of the pins $p$ on the back or inner side of the wheel CW, said finger being also adapted to pass up to the position shown in dotted lines in Fig. 3, (when the detent Y is pushed rearwardly by the teeth of the wheel CW,) and a sufficient opening is reached between said pins $p$, said opening being produced by the absence of one or more pins out from the holes in the combination-wheel CW. The upper arm of the lever W normally rests against the stop-stud $u'$, projecting from the frame D, and the finger of the lower arm of said lever is normally lower than the pins $p$, so that the latter can freely pass above it.

To cause the spring HS to retain a substantially constant torsional power when it is more or less tightly wound, and thus a uniform tendency to revolve the shaft CS carrying it, while the latter is making a half or two-thirds or three-quarters of a revolution, one of the spokes (shown wider in the wheel CW, Figs. 3 and 4) is heavier than the other to act as a counterbalance of power, or a weight is attached to an arm secured to the shaft CS, as shown in Fig. 18. Said heavy spoke also carries the stop-pin $y$ to arrest the wheel CW when it reaches normal position by coming in contact with the frame-post B″. When the spring HS is unwound, as at its minimum of power, the weight or heavy spoke of the wheel CW is at the initial point on a level with or slightly below the level of the shaft CS. The wheel CW being then revolved by the lever L and its pushing-pawl C the spring HS becomes more compressed and its power increased; but at the same time the counteracting power of gravity of the weight or weighted spoke diminishes until said weight is vertically above the shaft of the wheel, at which point its gravity has no effect. If the wheel is further advanced by the pushing-pawl C, the spring HS is further compressed and its power would be increased against the action of said pushing-pawl; but the gravity of the weight begins to be felt as a help for said pushing-pawl and continues to be felt with increased power until said weight has reached a point on the same level as the shaft CS or a little under it, which is the limit of the rotation of the wheel CW. By means of the weight the gravity or power of the lever L can be relied upon to rotate the wheel CW through the whole combination of impulses transmitted to the device. The same power of gravity of the weight or weighted spoke is used inversely to counteract the loss of power of the spring HS, when approaching its relaxed condition, in returning the wheel to its initial position.

If the inertia or retardation wheel RW is allowed to freely revolve under impulses of the lever and its retarding-pawl F, it would take a motion which is undesirable, and to prevent it a brake $m$ is pivoted between the frame-plates D and D′, adjacent to the retardation-wheel RW, with one end $m$ projecting over the edge of said wheel and the other end $m'$ bent downwardly to nearly a right angle and extending down close to the side of said wheel. The arm $m$ of the brake acting under gravity will drop down and rub against the rim of the wheel RW and by virtue of the friction stop its motion; but said wheel must at times be free to move under the weight of lever L and its retarding-pawl F, and consequently the arm $m$ must be raised upward just before the retarding-pawl F strikes upon the retardation-wheel RW. To produce this action, the end $m'$ of the brake is provided with an upwardly-inclined arm M″, and the lever L is provided with an arm O, extending downward, which will strike upon the arm $m''$ of the brake, (immediately before the retarding-pawl F strikes the wheel RW,) causing the arm $m$ to be elevated and releases RW and allows it to move freely, as described, until the lever L descends to the end of its downward course, in which position the lower extension $m'$ will be forced against the side of RW and by virtue of the friction prevent RW from accumulating any motion, and it will be seen that the arm O and extension $m''$ in the position described form the downward limit or stop of lever L.

The arms $m$ and $m'$ are provided with adjusting-screws $w$ for making the fine adjustment required with said arms. The contact-spring S is also provided with an adjusting-screw $s^2$. It is desirable that the retarding-pawl F strike upon the wheel RW at or near the same position every time. This result is obtained by the guide G, which is made rigid to the frame-plate D′ and has a loop at its free end to receive and guide said pawl.

To cause the wheel CW to stop at normal position when it is allowed to freely act under the tension of the spring HS, a pin or projection $y$ is connected rigidly to the said wheel and encounters a stop-pin B″, which is made rigid to the frame-plate D, as shown in Figs. 1, 3, and 4.

The pins that are used in forming the combination may be temporarily but firmly inserted into the wheel so as to be changed at pleasure for changing the combination, or they may be projections that are a part of the wheel, as shown in Fig. 14 at $p'$, or rigidly attached to the wheel, segment, or bar. The detent Y may be pivoted to a rigid bearing, and pawls provided with hooks operating therewith may be used, as shown in Fig. 12. The toggle arms and levers may be substituted by a direct-acting lever, as shown in Fig. 12.

The pins $p$, extending from the front side of the wheel or carriage CW, are for elevating the pallet Z to a position where it can be caught or hooked by the hook A′, connected with the lever L, and thereby raised to a more elevated position for the purpose of disengaging the retaining pawl or detent Y from the teeth or notches of the wheel CW, and thereby allow said wheel to return to normal position when a long pulsation is made and the lever allowed to descend its entire course when the combination of impulses require a short pulsation to be made.

As will be seen by the combination set upon the wheel CW by pins extending from both sides of the wheel, those extending from the front side act upon the pallet Z (by raising it, as shown in dotted lines in Fig. 4, to the first elevated position) when a mistake is made in the combination, (by making a long pulsation, or allowing the lever L to move through its entire course when a short pulsation should be made.) Those extending from the other side of the wheel act upon the finger on the extension of the detent Y, as before described.

As will be seen by the modification shown in Fig. 12, the pallet Z, bell-crank lever W, with its finger, and detent Y may be dispensed with, and, as before described, detent Y may be simply pivoted to a rigid bearing, and pallet Z may be pivoted to the lever L and made into the form of a hook or hooks A′ and to operate directly upon said detent Y, (so as to allow the wheel or carriage to return to normal position,) or not to act upon the detent Y because of the presence of a pin upon said carriage, which holds one or both of said hooks back, so that they cannot catch under the end of the detent Y and raise it out of engagement with the teeth of the carriage CW. In said modification the hooks A' may be connected rigid to each other and act as one single part. In either case they would practically perform the same function as pallet Z.

The inertia or retardation device is covered with, preferably, fibrous material to facilitate the engagement of the end of the pawl F therewith, and may be mounted upon a vertical shaft, as shown in the majority of the main figures, or upon a horizontal shaft, as shown in Fig. 9, the periphery of said device being covered, also, with somewhat yielding material, as soft leather, wire-cloth, felt, cork, &c., and the wheel or device may be polygonal, as shown in Fig. 16, in place of cylindrical, its large face being for the end of the retarding-pawl F to operate upon.

The combination device may consist of a toothed wheel, as shown in Figs. 1 to 7, or a disk provided with pins or lugs on the same shaft as said toothed wheel, as shown in Fig. 15, or a segment of a toothed wheel, as shown in Fig. 14, or a toothed bar or rack, as shown in Fig. 13, the electromagnet and its armature being omitted in said figure to render the other operating parts clearer, the parts attached to the lever L being substantially the same as in Fig. 1.

In Figs. 10 and 17 the guide G for the retarding-pawl F is carried by the lever L. The pushing-pawl C in said Fig. 17 and in the other main figures has a short arm at its upper end, upon which a light spring Q presses to not only throw the lower end of said pawl into engagement with the teeth of the wheel CW, but to keep said lower end bearing against said wheel as a brake, so as to prevent the impulses given by the pawl to the wheel from carrying the latter a farther distance than that traveled by the end of the pawl.

In the modification shown in Fig. 19 a second retardation-wheel is shown as adapted for use with the device for producing the same result—viz., preventing the wheel CW from acquiring a momentum. The retarding-pawl F is shown as adapted to descend upon the top of the left-hand wheel immediately at the start of the descent of the lever L, while on the right-hand side a pawl F is adapted to press against the under side of the second retardation-wheel after the lever L has traveled about one-half of its vibration, so that the lever is retarded during its whole course, but more toward the last.

In Fig. 21 an application of my invention is shown in which a lock-bolt 25 is retained in a locked position until the circuit containing the electromagnet is closed and the armature 26 attracted.

In Fig. 22 an application of my invention is shown in which a visual signal 28 is represented as operated, the circuit being closed by the contact-pin CP touching the contact-spring CS, the normal position of the signal being shown by dotted lines.

In Fig. 23 an application of my invention is shown for firing an explosive (shown at 29) when the contact-pin CP touches the contact-spring S, which closes the circuit.

In Fig. 24 an application of my invention is shown for cutting in and cutting out of circuit an electric light 30, the light being shown in the circuit until the contact-pin CP is brought into contact with the spring S, closing the electric circuit containing the electromagnet 27, which operates the switch 31.

In Fig. 25 an application of my invention is shown for cutting in and cutting out of circuit a telephone-instrument 32, the instrument being shown out of circuit to remain in that condition until the contact-pin CP is brought into contact with the spring S, closing the electric circuit containing the electromagnet 27, which operates the switch-armature 33. The spring S, used with the device to form a contact with the pin CP, is to produce but a very light pressure upon said pin and to render the pressure substantially uniform during the whole length of the contact therewith. The spring is made as long as possible and has one or more coils at its stationary end, and said spring is in the path of the contact-pin, but nearly tangential thereto. The contact of the pin CP with said spring is a rubbing contact to remove the dust or slight amount of oxide that may be formed thereon by the electric spark produced when the pin leaves the spring at the time the device is returning to normal position. The position of the free end of the spring S relatively to the path of the contact-pin CP is regulated by the screw $s^2$, inserted in the insulating-plate and supporting said spring. The disk carrying the contact-pin CP is made adjustable upon its shaft, so that said disk can be rotated to adjust the position of the contact-pin relatively to the combination made by the pins $p$.

Having fully described my invention, what I claim is—

1. The combination of a wheel CW having upon its periphery a series of notches at regular intervals and provided with pins extending beyond the sides of said wheel, a pivoted lever L having the hooks A' and A", and the pushing pawl C loosely mounted thereon, said pushing pawl having one end adapted to engage with the notches and provided at the other end with a spring Q, a pivoted pallet Z, the detent Y, and a bent lever carrying said detent, a retarding pawl F loosely pivoted to the free end of the lever L, and the retardation wheel RW, a brake for said wheel provided with arms $m$, $m'$ and $m''$, a rigid extension O adapted to engage with the arm $m''$, a lever E' attached to the shaft PS of the lever L, a lever E attached to the shaft TS and adapted to engage with the lever E', a lever E" also attached to said shaft and provided with spring S", toggle lever arms T"

connecting the armature A with the shaft TS and means for actuating the said parts substantially as described.

2. The combination of a wheel CW provided with teeth at regular intervals, a retaining detent Y, a pivoted lever W carrying one end of said detent, a stirrup or swinging support X for said detent Y, a pallet Z adapted to elevate one end of the retaining detent Y and having a portion $z$ extending beyond its pivoted shaft T and pins extending beyond the sides of the wheel CW and adapted to engage separately with the pawl W and pallet Z, substantially as described.

3. The combination of a wheel CW having upon its periphery a series of teeth at regular intervals, a pivoted lever L provided with a pivoted pawl C acting upon said wheel, with a retardation wheel RW, a pivoted retarding pawl F mounted upon the free end of said lever and provided with a rigid guide G and adapted to engage upon the wheel RW and means for stopping the motion of said wheel, substantially as described.

4. The combination of a wheel having upon its periphery a series of teeth at regular intervals, a coiled spring upon the shaft of the said wheel to propel it in one direction and also to form a part of an electric circuit, a pin CP also carried by said shaft, and the adjustable contact spring, substantially as described.

5. The combination of the pivoted lever L, a wheel RW loosely mounted the weight of which will have the required inertia when acted upon by the lever L to retard said lever in its motion for a short period of time, a brake operating against said wheel, a retarding pawl F arranged to strike obliquely upon said wheel, a pawl A' pivoted to the lever L, the pallet Z, a pin $i$, a hook A" connected rigidly to the lever L and means for operating the parts, substantially as described.

6. The combination of a wheel mounted upon a shaft and provided with projections extending beyond its faces, a pivoted lever W upon which is loosely mounted a retarding pawl adapted to engage with the said wheel, and a lower extension of said lever adapted to engage with the said projections, a pivoted pallet Z adapted to engage with said retarding pawl upon being elevated and also adapted to engage with said projections, a pivoted hook adapted to engage with the said pivoted pallet Z and a rigid hook also adapted to engage with the said pallet Z, and means for operating the pushing pawl, hooks and levers, substantially as described.

7. The combination of a pushing pawl and movable ratchet device provided with interchangeable combination projections, a propelling lever and pawls to operate said device, a retarding device to retard the lever and pawls and thereby retard the combination device, and means as described for operating said levers.

8. The combination of a wheel having perforations and removable pins therein, a pushing pawl, a retarding pawl, a retarding wheel, a brake adapted to operate against said wheel, a retarding pawl to operate against the said retarding wheel, a guide to direct and a lever adapted to operate the said retarding pawl and an electro magnet adapted to operate said lever for the purpose herein specified.

9. In an electro-mechanical combination lock, a pivoted propelling lever provided with pawls, one of which acts upon a combination device having pins projecting therefrom and the other acts upon a retarding device, for the purposes herein specified.

10. The combination of an electro magnet and a propelling lever adapted to act upon a retarding device with a combination device having removable pins or projections thereon and adapted to be propelled by said lever a retaining pawl to retain the combination device or not to retain it according to the position of the combination pins, a stationary metal body and a movable contact pin adapted to close an electric circuit when the combination device is suitably propelled and retained for the purposes described.

11. The combination of a movable ratchet device and interchangeable projections thereon, a pivoted lever and a pawl thereon to operate said device, a rotatable retarding device and a retarding pawl carried by the pivoted lever and adapted to impinge upon the retarding device, substantially as described and for the purpose set forth.

12. The combination of a pivoted lever, and an electro magnet and means as described to operate said lever, a retardation device and a retarding pawl pivoted to said lever and adapted to strike obliquely upon the retardation device, substantially as described.

13. The combination of a propelling lever L, a pushing pawl C, a detent Y and hooks adapted to disengage or elevate the detent Y as described.

14. In a movable combination carriage, a pushing pawl to propel said carriage, a detent to retain said carriage, a hook or pawl to engage with and elevate the detent and thereby release said carriage or not to engage with said detent according to the arrangement of the combination projections on the carriage as described.

15. In a movable combination carriage CW, a pushing pawl C, a detaining pawl Y, a combination pawl A', and combination projections substantially as described.

16. A movable combination carriage CW, with combination projections operating with said carriage and adapted with the combination pawl A', propelling lever L and detaining pawl Y to release said carriage, substantially as described.

17. The combination of a retarding device, consisting substantially of a wheel, a propelling lever, a pushing pawl pivoted to said lever and a guide to direct said pawl against said retarding device, substantially as described.

18. The combination of a retarding device consisting of a flat rotary disk RW, a retarding pawl F adapted to engage with its flat face to rotate said device, and a brake adapted to check said rotation, substantially as described.

19. A retarding device consisting of a flat rotary disk RW, a retarding pawl F to engage with its flat face, in combination with a guide G adapted to guide said pawl, substantially as described.

20. The combination of two retarding devices RW and a lever L and pawls acting upon said devices, as and for the purpose specified.

21. The combination of an electro-magnet EM adapted to operate a lever L, a wheel or mass of matter RW rotatively mounted, and adapted to retard the motion of said lever, a combination carriage CW adapted to be rotated by said lever and provided with a detent Y for retaining the rotation of CW, substantially as described.

In testimony whereof I affix my signature in presence of two witnesses.

WILLIAM W. ALEXANDER.

Witnesses:
C. W. HASTINGS,
GARRETT ELLISON.